(12) United States Patent
Labrot et al.

(10) Patent No.: US 8,487,277 B2
(45) Date of Patent: Jul. 16, 2013

(54) LAMINATED GLASS PANEL FOR A HEADS-UP DISPLAY SYSTEM

(75) Inventors: Michael Labrot, Aachen (DE); Marie-Helene Breniaux, Kingersheim (FR); Jean Sablayrolles, Crouy en Thelle (FR)

(73) Assignee: Saint-Gobain Glass France, Courbevoie (FR)

( * ) Notice: Subject to any disclaimer, the term of this patent is extended or adjusted under 35 U.S.C. 154(b) by 57 days.

(21) Appl. No.: 13/375,350

(22) PCT Filed: Jun. 1, 2010

(86) PCT No.: PCT/FR2010/051059
§ 371 (c)(1),
(2), (4) Date: Nov. 30, 2011

(87) PCT Pub. No.: WO2010/139889
PCT Pub. Date: Dec. 9, 2010

(65) Prior Publication Data
US 2012/0068083 A1    Mar. 22, 2012

(30) Foreign Application Priority Data
Jun. 3, 2009 (FR) .................................... 09 53662

(51) Int. Cl.
*G01N 21/64* (2006.01)
(52) U.S. Cl.
USPC .................................................. 250/461.1
(58) Field of Classification Search
USPC .................................................. 250/461.1
See application file for complete search history.

(56) References Cited

U.S. PATENT DOCUMENTS

| 4,879,346 | A  | * | 11/1989 | Bopp et al. | 525/146 |
| 7,868,090 | B2 | * | 1/2011 | Juikar et al. | 525/121 |
| 8,222,347 | B2 | * | 7/2012 | Chakravarti et al. | 525/418 |
| 2004/0016938 | A1 | | 1/2004 | Baretz et al. | |
| 2005/0123243 | A1 | | 6/2005 | Steckl et al. | |
| 2008/0161468 | A1 | * | 7/2008 | Juikar et al. | 524/423 |
| 2008/0193686 | A1 | | 8/2008 | Loergen et al. | |
| 2008/0242784 | A1 | * | 10/2008 | Ganesan et al. | 524/413 |

FOREIGN PATENT DOCUMENTS

| DE | 40 24 330 | 2/1992 |
| GB | 844 540 | 8/1960 |
| WO | 2008 132368 | 11/2008 |

OTHER PUBLICATIONS

U.S. Appl. No. 13/695,676, filed Nov. 1, 2012, Labrot, et al.
U.S. Appl. No. 09/488,536, field Jan. 21, 2000, Frost, et al.
M. Day and D.M. Wiles, "Photochemical Degradation of Poly(ethylene Terephthalate). I. Irradiation Experiements with the Xenon (Continued)

*Primary Examiner* — Kiho Kim
(74) *Attorney, Agent, or Firm* — Oblon, Spivak, McClelland, Maier & Neustadt, L.L.P.

(57) ABSTRACT

The present invention relates to a laminated glazing for information display, of the automobile windshield or architectural glazing type, including an assembly of at least two transparent sheets of inorganic glass or of a strong organic material, joined together by an interlayer of a thermoformable material or by multilayer foils incorporating such an interlayer, the glazing being characterized in that a luminophore material of the hydroxyterephthalate type is integrated into the interlayer, allowing the display. The invention also relates to a device for displaying an image on transparent glazing, including laminated glazing of the above type and a source generating concentrated UV radiation of the laser type, the radiation of which is between 350 and 410 nm, the UV radiation being directed onto the area or areas of the glazing that includes the terephthalate-type luminophore layer.

17 Claims, 1 Drawing Sheet

OTHER PUBLICATIONS and Carbon Arc", Journal of Applied Polymer Science, vol. 16, pp. 175-189, Dec. 31, 1972. XP-002565384.

International Search Report issued Oct. 7, 2010 in PCT/FR2010/051059 filed Jun. 1, 2010.

* cited by examiner

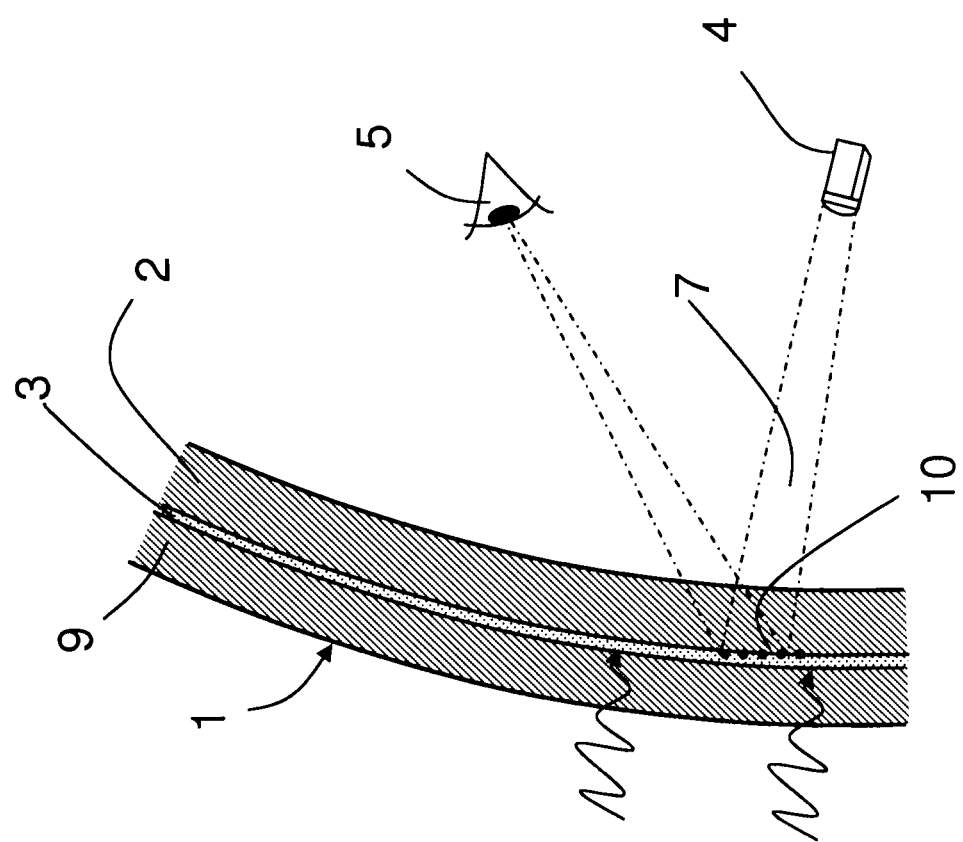

LAMINATED GLASS PANEL FOR A HEADS-UP DISPLAY SYSTEM

The present invention relates to the field of display systems projected onto transparent screens, particularly automobile windshields or architectural glazing.

Most particularly, the present invention, even if it is not limited thereto, relates to the field of what are called "head-up" display systems, called HUD (Head-Up Display) systems in the art. Such systems are of use especially in aircraft cockpits and in trains, but also nowadays in private motor vehicles (cars, lorries, trucks, etc.).

In such systems, the glazing generally consists of a sandwich structure, comprising most simply two sheets of strong material, such as sheets of glass. The sheets of strong material are joined together by a thermoformable interlayer foil usually comprising or consisting of polyvinyl butyral (PVB).

Such head-up display systems, which make it possible to display information projected onto glazing and reflected back to the driver or observer, are already known. These systems make it possible in particular to inform the driver of the vehicle without him looking away from the field of view toward the front of the vehicle, thereby greatly increasing safety. The driver perceives a virtual image which is located at a certain distance behind the windshield.

Most conventionally, such an image is obtained by projecting information onto a windshield having a laminated structure, i.e. one formed from two glass sheets and a plastic interlayer. However, the driver then sees a double image, namely a first image reflected by that surface of the windshield facing the interior of the passenger compartment and a second image by reflection off the external surface of the windshield, these two images being slightly offset with respect to each other. This offset may cause the information seen to be disturbed. To alleviate this problem, mention may be made of the solution proposed in U.S. Pat. No. 5,013,134 which describes a head-up display system using a laminated windshield formed from two glass sheets and a polyvinyl butyral (PVB) interlayer, the two external surfaces of which windshield are not parallel but wedge-shaped, so that the image projected by a display source and reflected by that surface of the windshield facing the passenger compartment is practically superimposed on the same image coming from the same source reflected by that surface of the windshield facing the outside. To eliminate ghosting, it is conventional to produce wedge-shaped laminated glazing using an interlayer sheet having a thickness that decreases from the top edge of the glazing to the bottom edge. However, it is necessary for the PVB profile to be very regular and not to have thickness variations, as these are transmitted during assembly to the windshield and lead to local angle variations.

Alternatively, it is proposed in U.S. Pat. No. 6,979,499 B2 to send an incident beam, of appropriate wavelength, onto luminophores directly incorporated into the glazing, these being capable of responding to the excitation by emitting light radiation in the visible light range. In this way, a real image and no longer a virtual image is formed directly on the windshield. This image is also visible by all the passengers of the vehicle. In particular, U.S. Pat. No. 6,979,499 B2 describes laminated glazing with an interlayer foil of the polyvinyl butyral (PVB) type, the two external surfaces of which are parallel and in which an additional layer of luminophores is incorporated. The luminophores are chosen according to the wavelength of the incident excitation radiation. This wavelength may be in the ultraviolet range or the IR range. The luminophores, under this incident radiation, reemit radiation in the visible range. This process is then referred to as down-conversion when the incident radiation is UV radiation and up-conversion when the incident radiation is IR radiation. Such a construction makes it possible, according to said document, to reconstruct an image of any object directly on the windshield or glazing. According to this disclosure, luminophore materials are deposited over the entire main surface of one of the sheets constituting the laminated glazing (PVB or glass) in the form of a continuous layer comprising several types of luminophores. The image sought is obtained by selectively exciting a predetermined area of the luminophore layer. The location of the image and its shape are obtained by means of an excitation source controlled and modulated by external means.

However, the experiments carried out by the applicant have shown that such HUD devices incorporating luminophores in the assembled glazing are characterized by too low a luminance under a conventionally unfocused UV excitation source. In addition, the concentration of the luminophores is limited by the haze value of the windshield, which must not be too high so as not to disturb the driver's vision.

In particular, it appears that the luminous intensity obtained with such devices still remains very insufficient when the external brightness is high, and in general in daytime vision, since said luminous intensity does not exceed a few tens of candelas. Typically, measurements on a conventional HUD system, i.e. operating according to the principles of reflection, have shown that monochromatic radiation is visible by an observer, for example in the viewing area of the driver of a vehicle, if the luminance is of the order of several hundred $cd/m^2$, notably especially greater than 500 $cd/m^2$ or even 1000 $cd/m^2$, under normal external, daylight, illumination conditions of the windshield.

To obtain such a luminance, it is possible to use excitation sources that generate concentrated and directed UV light delivered by more specific sources of the laser diode type. The term "concentrated" is understood in the context of the present description to mean that the power per unit area on the glazing of the beam output by the generating source is greater than 120 $mW/cm^2$ and preferably between 200 $mW/cm^2$ and 20 000 $mW/cm^2$, or even between 500 $mW/cm^2$ and 10 000 $mW/cm^2$. However, the use of such sources can be envisioned only with power levels that remain limited, so as to avoid beam hazard problems, especially on the outside of the vehicle. In particular, by working with a wavelength of less than 410 nm, it is possible to prevent most of the laser radiation from passing to the outside, since at these wavelengths PVB strongly absorbs the UV radiation.

Another crucial problem due to the use of concentrated light sources of the laser type stems from the choice of luminophore used: this must have a high incident radiation conversion efficiency but must not be degraded under the external UV radiation, nor in particular under the incident concentrated UV radiation, especially of the laser type, so as to ensure a suitable lifetime of the display function.

In such glazing for displaying information directly on its surface, the choice of luminophore thus appears to be crucial and is necessarily a compromise between various characteristics and properties associated with such a use, among which are the following:

a high luminance provided by a good quantum yield under the incident UV excitation;

a transparency such that the haze does not exceed 2% and the light transmission is greater than 70%;

chemical compatibility with the constituent thermoplastic foil of the glazing;

a neutral color, especially when the luminophore is present in high concentration in the glazing, for example as measured by what is called the "Yellowness Index" test according to the DIN 6167 standard;

maximum durability in ageing tests under incident solar UV radiation, especially such as that measured by the Arizona® test in this field; and maximum durability in ageing tests under incident concentrated UV radiation, particularly laser radiation, such as that especially measured by the time observed before the initial luminance, measured in cd/m$^2$, is reduced by one half.

More precisely, the present invention relates to laminated glazing for information display, of the automobile windshield or architectural glazing type, comprising an assembly of at least two transparent sheets of inorganic glass or of a strong organic material, joined together by an interlayer of a thermoformable material or by multilayer foils incorporating such an interlayer, said glazing being characterized in that a luminophore material of the hydroxyterephthalate type is integrated into said interlayer, allowing said display.

The term "hydroxyterephthalate" is understood to mean a diester derived from terephthalic acid, satisfying the general formula: R—OOC-Φ(OH)$_x$—COOR or

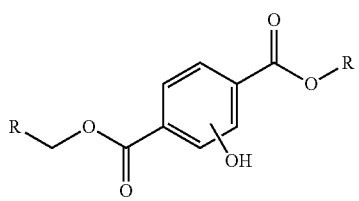

in which:

Φ denotes a benzene ring substituted with at least one hydroxyl (OH) group;

R is a hydrocarbon chain comprising 1 to 10 carbon atoms, preferably 1 to 5 carbon atoms, in particular 1 or 2 carbon atoms; and x is equal to 1 or 2.

Preferably, the hydroxyl group is in the 2 position and/or the 5 position on the aromatic ring. In particular, said luminophore may be a dialkyl-2,5-dihydroxyterephthalate according to the developed formula:

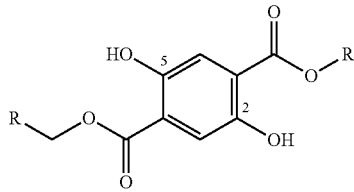

For example, said luminophore may be diethyl-2,5-dihydroxyterephthalate $(HO)_2C_6H_2(CO_2CH_2CH_3)_2$, the emission wavelength of which is close to 450 nm:

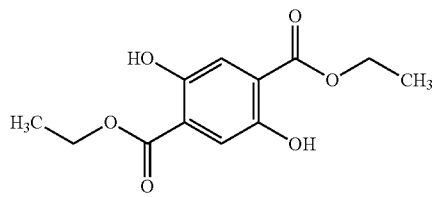 [SMILES: CCOC(=O)c1cc(O)c(C(=O)OCC)cc1O]

Typically in the glazing according to the invention, the terephthalate-type luminophore is solvated in said thermoplastic material.

For example, the thermoformable material constituting said interlayer is chosen from the group consisting of PVBs, plasticized PVCs, polyurethane (PU) and ethylene-vinyl acetates (EVAs).

Preferably, the thermoformable material is PVB.

According to one possible embodiment, the transparent sheets are joined together by a multilayer foil incorporating a PVB interlayer, for example a foil comprising a succession of PVB/PET/PVB layers, in which PET is polyethylene terephthalate.

The invention also relates to a process for manufacturing laminated glazing according to one of the above embodiments, in which the thin film is deposited on the PVB-type thermoplastic foil by a technique chosen from screenprinting techniques, inkjet printing techniques or printing techniques of the offset, flexographic or photogravure type, in the form of a solution of an alcohol with a PVB-type binder, and then the glazing is laminated in an autoclave.

Finally, the invention relates to a device for displaying an image on transparent glazing, comprising laminated glazing according to one of the above embodiments and a source generating concentrated UV radiation of the laser type, the radiation of which is between 350 and 410 nm, the UV radiation being directed onto the area or areas of the glazing comprising the terephthalate-type luminophore.

In the display device, the source generating UV radiation typically comprises at least one laser diode emitting UV excitation radiation, the wavelength of which is less than 410 nm and preferably is between 350 and 405 nm.

For example, the power per unit area of the beam output by the generating source is greater than 120 mW/cm$^2$ and preferably between 200 mW/cm$^2$ and 20 000 mW/cm$^2$, or even between 500 mW/cm$^2$ and 10 000 mW/cm$^2$.

Preferably, the display device further comprises means for modulating the power of the source generating UV radiation so as to adapt the luminance to the external illumination conditions of the glazing, for example depending on the insolation conditions of the glazing.

For example, the modulation means may define at least one power level suitable for daytime use and at least one power level, below the previous one, suitable for nighttime use.

The invention and its advantages will be better understood on reading the following embodiment of the invention, in conjunction with the single appended FIGURE.

The appended FIGURE serves to illustrate the invention and the advantages thereof.

This FIGURE shows schematically a windshield and a device according to the invention.

The windshield 1 is made up of two sheets 2 and 9, typically glass sheets, but they could also consist of sheets of strong plastic of the polycarbonate type. Present between the two sheets is an interlayer foil 3 made of a plastic such as PVB (polyvinyl butyral), plasticized PVC, PU or EVA, or else a multilayer thermoplastic foil incorporating for example PET (polyethylene terephthalate), the succession of layers in which is for example PVB/PET/PVB.

Particles of an organic luminophore of the terephthalate type according to the invention are deposited on at least a portion of the internal surface of the thermoplastic interlayer foil 3 before lamination, that is to say before the various sheets are assembled.

The luminophore particles have a size distribution predominantly between 1 and 100 microns. The term "predominantly" is understood to mean that more than 90% of the particles making up the commercial powder have a diameter between 1 and 100 microns. Preferably, the terephthalate-type luminophore particles are subjected to a prior treatment facilitating their impregnation in the thermoplastic PVB foil. More precisely, the particles are precoated with a PVB-based binder.

A laser source 4 emitting excitation light radiation is used to emit incident concentrated radiation 7 having a wavelength close to 400 nm. The terephthalate-type luminophore 10, solvated in molecular form in the interlayer thermoplastic foil 3, has a high absorption coefficient for the incident radiation. It then reemits radiation in the visible range, i.e. radiation close to 450 nm, with an efficiency greater than 80%.

The visible radiation emitted by the luminophore is then directly observable by the eye 5 of the driver, who thus sees the object on the windshield without having to avert his eyes from the road. In this way, an image may be directly formed on a laminated windshield without it being necessary to adapt the structure of the latter, for example the thickness of the interlayer foil, thereby enabling HUD systems to be manufactured economically.

The source used to generate the concentrated radiation is for example a UV source of the UV laser type. For example, it is of the solid-state laser, semiconductor laser diode, gas laser, dye laser or excimer laser type, but it is not limited thereto. In general, any known source generating a concentrated and directed flux, within the meaning of the present invention, of UV radiation may be used as excitation source according to the invention.

According to one possible embodiment, a DLP projector may be used to modulate the excitation wave according to the embodiment described in paragraph [0021] of the patent application US 2005/231652. According to the invention, it is also possible to use as UV excitation source a device as described in patent application US2004/0232826, especially as described in connection with FIG. 3.

The luminophore may be deposited on the PVB foil by, for example, screenprinting techniques, inkjet printing techniques or offset, flexographic or photogravure printing techniques.

Preferably, the deposition by one of the above techniques is carried out by dissolving or dispersing the luminophore particles in at least one matrix chosen for facilitating the incorporation and very rapid dissolution of the luminophore in the thermoplastic foil, especially while passing through the autoclave used to assemble the laminated glazing. Binders based on PVB, or on other plastics of the PMMA type, have been shown to be particularly effective for such a function.

According to one of the essential features of the invention, it is apparent that the luminophores 10 of the terephthalate family can thus be incorporated into the PVB plastic foil in a sufficiently intimate manner so that their presence can no longer be detected by conventional light microscopy techniques. Without this being able to be interpreted as any theory, one possible explanation would be that the terephthalate molecules are entirely solvated in the PVB foil after passage through the autoclave, that is to say they are finally in the form of individual particles in the plastic.

Certainly because of this phenomenon, the applicant has found that, in the case of an application in which an image is displayed through transparent glazing, the use of terephthalate-type luminophores allows the following requirements, necessary for such an application, to be effectively met:

a) an acceptable sharpness of the image;
b) a luminescence intensity sufficient for it to be observable by the driver;
c) a haze, caused by affixing the film on the windshield, measured according to the ANSI Z26.1-1996 standard, of less than 2% or even less than 1%; and
d) a light transmission greater than 70% and preferably greater than 75%.

Furthermore, as illustrated by the examples below, the terephthalate-type luminophores have shown durability properties under incident solar UV radiation and excitation UV radiation, especially laser radiation, which are greatly superior to other organic or inorganic luminophores.

The embodiment above does not of course have any limiting effect on the present invention in any of the aspects described above.

EXAMPLES

The following examples serve to illustrate an exemplary embodiment of a laminated windshield according to the present invention and its advantages:

Firstly, a laminated windshield was synthesized according to the present invention, comprising the succession of two glass sheets joined together by a PVB interlayer foil 760 microns in thickness. Assembly was carried out according to the well-known techniques of the art.

Prior to lamination, a luminophore layer was deposited on a square of glass measuring about 10×10 cm$^2$. The luminophore was chosen from various luminophore powders well known for absorbing strongly in the UV range, as listed in Table 1 below. The luminophore was incorporated into the glazing by a conventional screenprinting technique. The luminophore was deposited on that surface of the inner glass sheet 2 facing the PVB foil before the assembly step (see FIGURE). Without departing from the scope of the invention, the luminophore may also be deposited on the inner surface of the PVB.

More specifically, the luminophore is diluted beforehand in a PVB-type binder. The dilution is adjusted so as to obtain in the end a luminophore concentration of 1% by weight of pigment relative to the weight of binder. As a general rule, the binder contains a diluent based on ethanol or on other solvents, so as to optimize the viscosity for deposition by screenprinting. The trials carried out by the applicant have shown that it is possible to work with concentrations ranging from 0.1% to 10% by weight of pigment in a diluent, concentrations of 0.5 to 5% giving moreover the best compromises between the result of the haze obtained and the observed luminance.

Mixture were then screen-printed using conventional techniques on the glass sheet. The thickness of the initial layer deposited by screenprinting, incorporating the luminophore in the PVB/ethanol mixture, was about 10 to 40 microns.

The solvent was then left to evaporate before the two glass sheets and the PVB foil were laminated using autoclave techniques conventional in this field. A windshield as illustrated in the FIGURE was thus obtained.

The parameters characterizing the application, such as those described above, were measured on the various glazing panes obtained, using the following protocols:

the haze was measured according to the automotive standard ANSI Z26.1 (1996);

the heat resistance of the glazing was determined in accordance with the test described in the European standard ECE R43 A3/5;

the durability to incident UV solar radiation was measured by the Arizona® test, consisting in exposing the glazing to radiation emitted by a xenon arc lamp in order to simulate solar radiation according to the ISO 4892 (part 2) standard at a temperature of 90° C. Such exposure allows the luminophore to undergo accelerated ageing. The measurement of the time needed for the initial luminance to be reduced by one half was used to estimate and compare, directly and simply, the durability properties of the various luminophores tested under solar radiation;

the coloration of the glazing was measured by the "Yellowness Index" test according to the DIN 6167 standard after 400 hours of exposure of the glazing to the above-mentioned Arizona test; and the durability to excitation UV laser radiation was measured by the following method:

a laser beam of 200 mW power intensity and 405 nm wavelength was directed directly onto that portion of the glazing comprising the luminophore layer, on an area of about 2 mm². A luminance meter was directed at the light spot emitted and the luminance in cd/m² was continuously measured.

Thus, the following were measured:

the initial monochromatic luminance of the emission radiation, a monochromatic luminance of around several hundred cd/m² being judged to be sufficient in order for the spot to be perfectly visible by the driver looking at the road under normal insolation conditions, as described above;

the maximum wavelength of the emitted radiation and the color observed by the vehicle driver, for example; and the time needed for the initial luminance to be reduced by one half, this value characterizing, according to the invention, the durability of the luminophore under the incident concentrated radiation.

Continuously illuminating a small fixed spot results in rapid degradation of the luminophore and therefore a rapid reduction in its luminance. This severe method enables the luminophore to undergo accelerated ageing, while maintaining the wavelength of the final excitation beam, but it is very far from normal operating conditions for which the lifetime of the luminophore will obviously be much longer.

The objective of such accelerated ageing was thus to achieve rapid discrimination of the luminophores in the intended application.

All the observed results are given in Table 1.

TABLE 1

| Nature of the luminophore | BAM (inorganic)* | Lum 1 (red): Eu(TPBDTFA)$_3$Phen** | Lum 2: β-quinophthalone | Lum 3: naphthalimide*** | Lum 4: diethyl-2,5-dihydroxy-terephthalate |
|---|---|---|---|---|---|
| Yellowing index (DIN 6167) after 400 h | — | Yellowing | No yellowing | Yellowing | No yellowing |
| Heat resistance (ECE R43 A3/5) | — | Out of spec. (yellowing) | In spec. | In spec. | In spec. |
| Haze (%) (ANSI Z26.1 (1996)) | >5 | 0.80 | 0.47 | 0.70 | 0.79 |
| Durability under UV radiation (Arizona) | — | 15 hours | 27 hours | 1600 hours | 1600 hours |
| Maximum emission wavelength (nm) under laser (405 nm; 200 mW) beam | 450 nm | 620 nm | 520 nm | 430 nm | 450 nm |
| Perceived color | Blue | Red | Green | Blue-violet | Blue |
| Initial luminance under laser (405 nm; 200 mW) beam | <30 Cd/m² | >500 Cd/m² | >500 Cd/m² | ~1800 Cd/m² | ~4700 Cd/m² |
| Durability under laser (405 nm; 200 mW) excitation | — | 1.5 hours | 15 minutes | 21 hours | 49 hours |

*BAM: BaMgAl$_{10}$O$_{17}$:Eu$^{2+}$
**Eu(TPBDTFA)$_3$Phen: TPBDTFA = 1-(4'-(5-(4-tert-butylphenyl)-1,3,4-oxadiazol-2-yl)biphenyl-4-yl)-4,4,4-trifluorobutane-1,3-dione; phen = (1,10-phenanthroline)
***4,5-dimethyloxy-N-(2-ethylhexyl)naphthalimide.

The results given in Table 1 show that the inorganic luminophore does not enable substrates sufficiently transparent for the application to be obtained, the haze being greater than 5% for all the trials carried out, while the luminance is very much lower than that observed in the case of the organic luminophores.

Among the organic luminophores, it may be seen that the luminophores conventionally known for their high luminescence under UV excitation have extremely poor durabilities under a concentrated excitation beam of the laser type or more radically under conventional insolation conditions. The hydroxyterephthalate-type luminophore according to the invention has better durability properties, making it possible to envision HUD-type applications under a concentrated, especially laser, incident beam.

The invention claimed is:

1. A laminated glazing, comprising:
   at least two transparent sheets of inorganic glass or of a strong organic material, and
   an interlayer of a thermoformable material, or a multilayer foil comprising an interlayer of a thermoformable material,
   wherein the interlayer or the foil joins the transparent sheets, and
   the interlayer comprises a hydroxyterephthalate luminophore.

2. The laminated glazing in of claim 1, wherein the luminophore is a hydroxyalkylterephthalate, of formula:

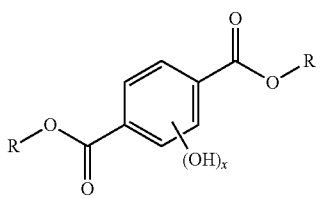

wherein R is a hydrocarbon chain comprising from 1 to 10 carbon atoms, and x is 1 or 2.

3. The laminated glazing of claim 1,
   wherein the luminophore comprises a hydroxyl group in a 2 position, a 5 position, or both a 2 position and a 5 position on a benzene ring.

4. The laminated glazing of claim 1, wherein the luminophore is a dialkyl-2,5-dihydroxyterephthalate of formula:

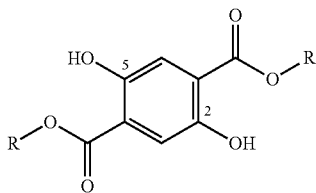

wherein R is a hydrocarbon chain comprising from 1 to 10 carbon atoms.

5. The laminated glazing of claim 1, wherein the luminophore is diethyl-2,5-dihydroxyterephthalate.

6. The laminated glazing of claim 1, wherein the luminophore is solvated in the thermoformable material.

7. The laminated glazing of claim 1, wherein the thermoformable material is selected from the group consisting of polyvinyl butyral (PVB), plasticized PVC, polyurethane (PU), and ethylene-vinyl acetate (EVA).

8. The laminated glazing of claim 1, wherein the thermoformable material is PVB.

9. The laminated glazing of claim 1, comprising a multilayer foil comprising a PVB interlayer.

10. The laminated glazing of claim 9, wherein the multilayer foil comprises a succession of PVB/PET/PVB layers, wherein PET is polyethylene terephthalate.

11. A process for manufacturing the laminated glazing of claim 1, comprising:
    depositing a solution of an alcohol with a PVB binder on the interlayer or the foil by screenprinting, inkjet printing, offset printing, flexographic printing, or photogravure printing, and then
    laminating the glazing in an autoclave.

12. A device for displaying an image on a transparent glazing, the device comprising:
    the laminated glazing of claim 1, and
    a source adapted to generate concentrated laser UV radiation,
    wherein a wavelength of the radiation is from 350 to 410 nm, and
    the source is adapted to direct the UV radiation onto an area or areas of the glazing comprising the luminophore.

13. The device of claim 12, wherein the source comprises:
    at least one laser diode adapted to emit UV excitation radiation with a wavelength of less than 410 nm.

14. The device of claim 13, wherein the wavelength of the UV excitation radiation is from 350 to 405 nm.

15. The device of claim 12, wherein the source outputs a beam with a power per unit area of greater than 120 mW/cm$^2$.

16. The device of claim 15, wherein the power per unit area is from 200 mW/cm$^2$ to 20,000 mW/cm$^2$.

17. The device of claim 12, wherein a power of the source is configured for modulation so as to adapt to external daylight conditions.

* * * * *